H. DESPAIGNE.
SCREW BOLT ROLLING MACHINE.
APPLICATION FILED NOV. 6, 1907.
999,634.
Patented Aug. 1, 1911.
6 SHEETS—SHEET 4.
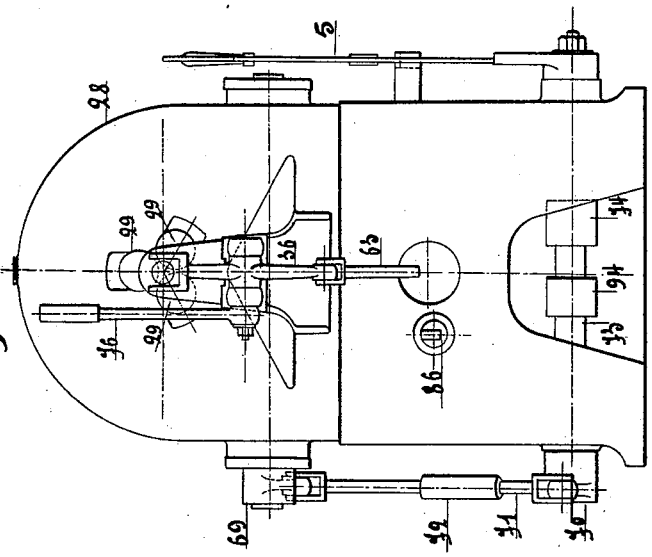
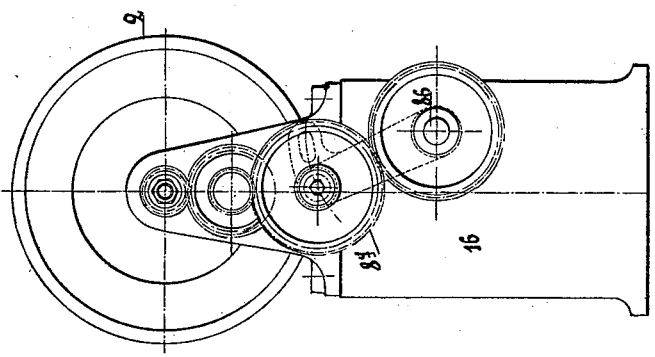

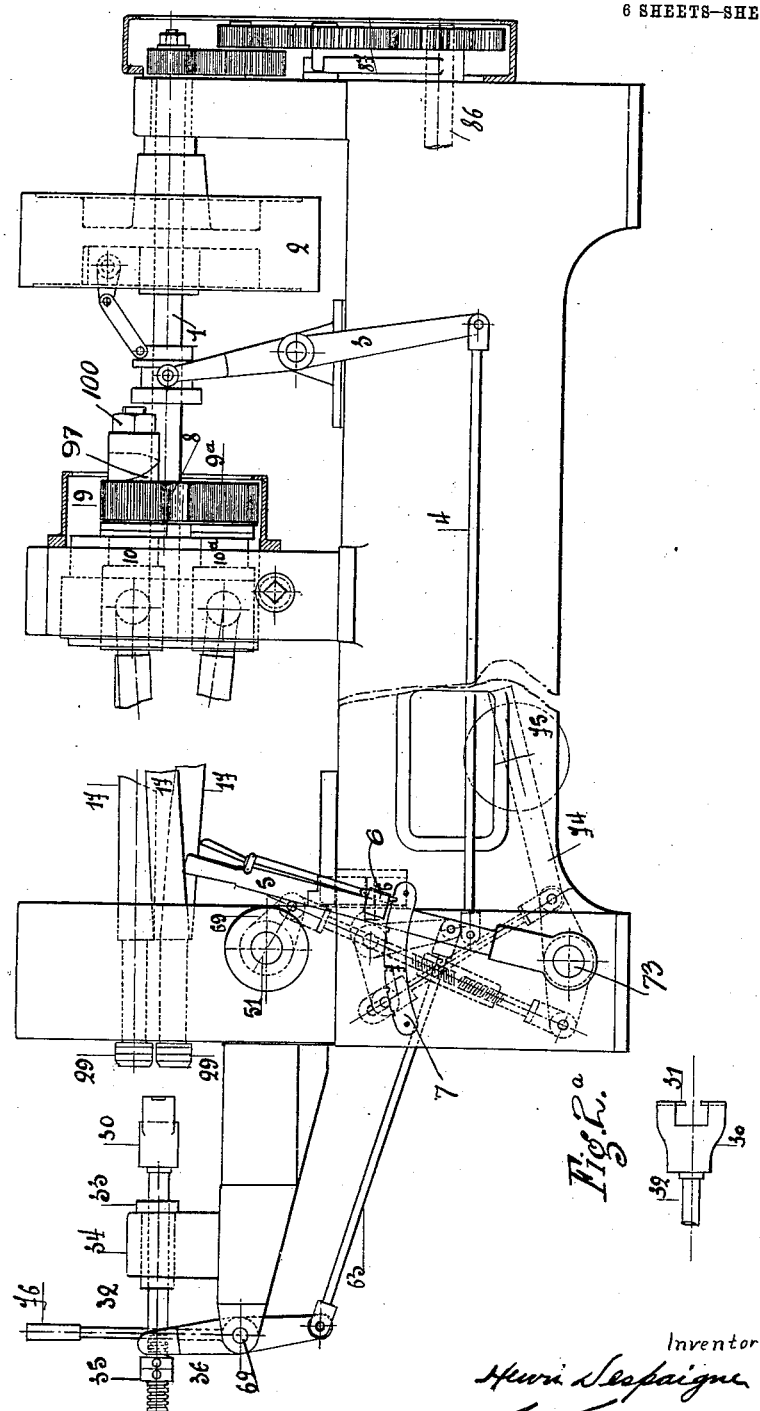

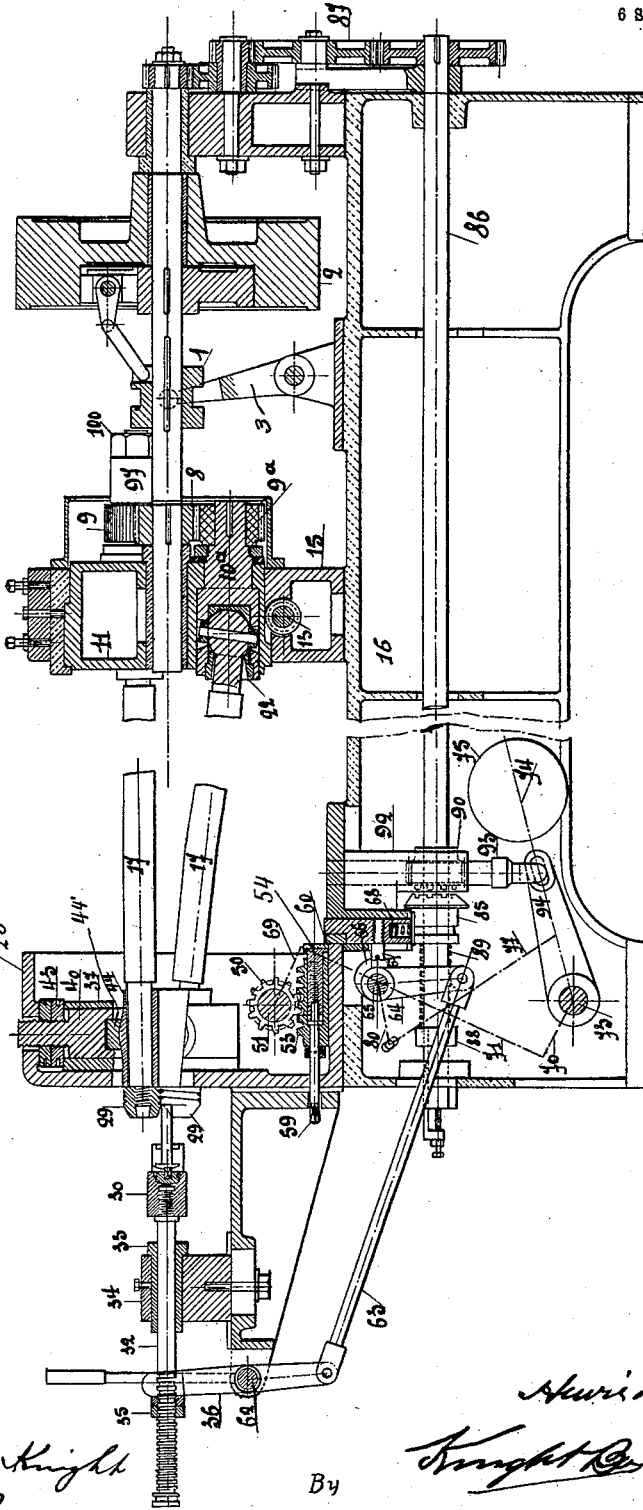

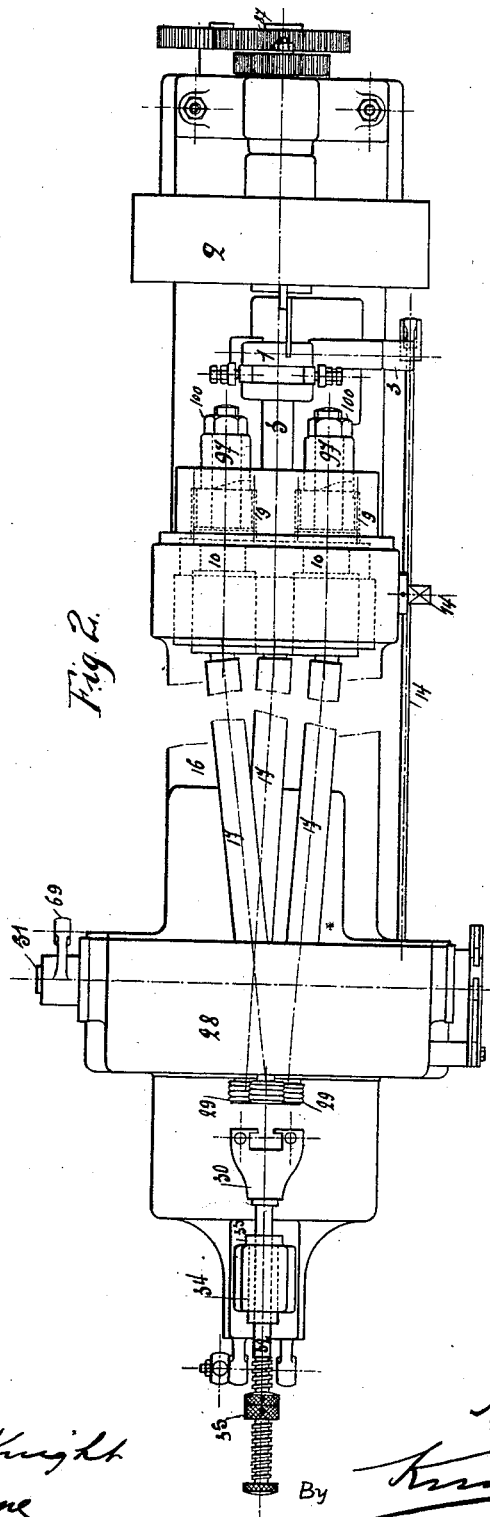

H. DESPAIGNE.
SCREW BOLT ROLLING MACHINE.
APPLICATION FILED NOV. 6, 1907.
999,634.
Patented Aug. 1, 1911.
6 SHEETS—SHEET 5.
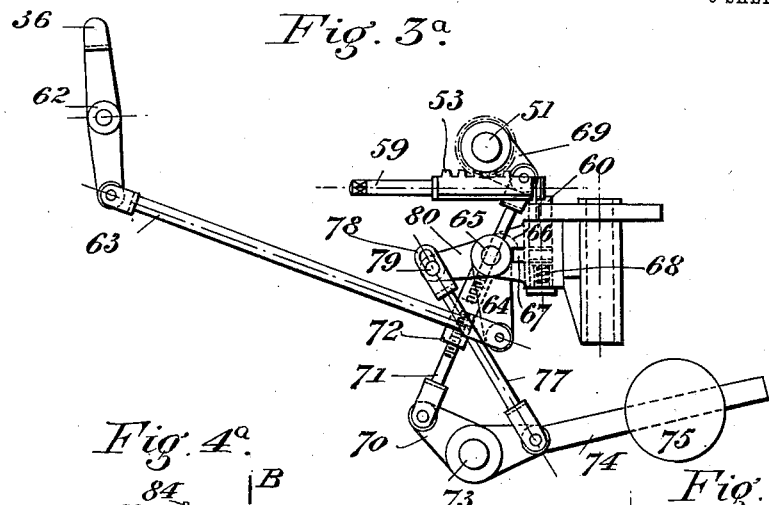
Fig. 3ª
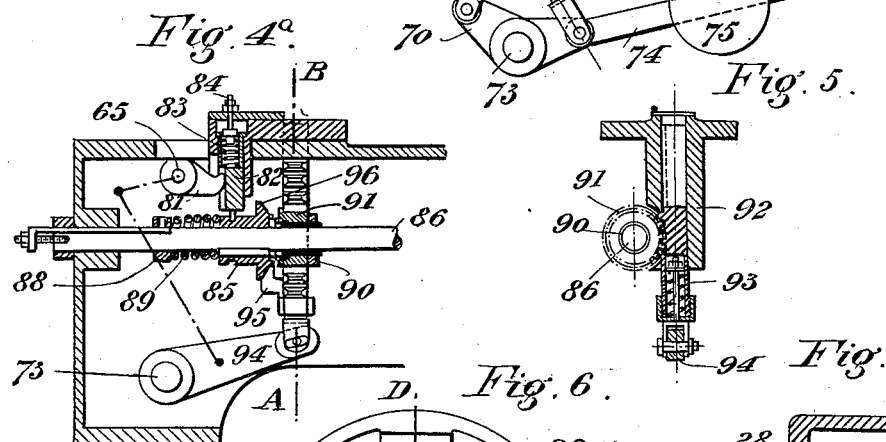
Fig. 4ª  Fig. 5.
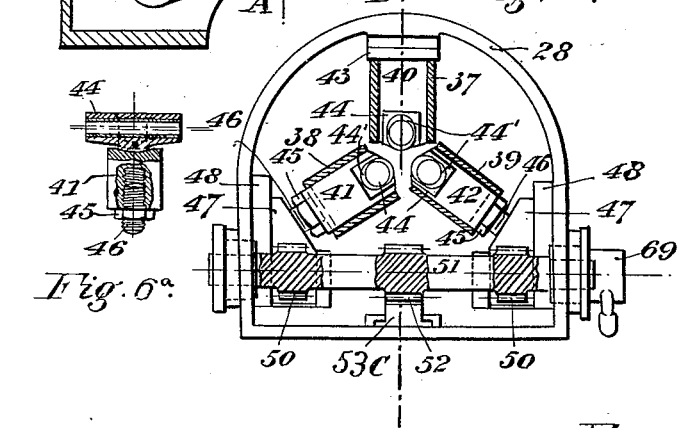
Fig. 6.  Fig. 6ª
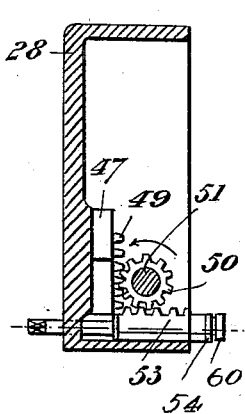
Fig. 7.
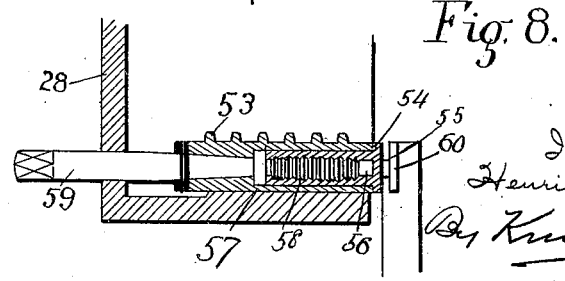
Fig. 8.
Witnesses
J. M. Wynkoop
C. B. Mellon
Inventor
Henri Despaigne
By Knight Bros
atty
COLUMBIA PLANOGRAPH CO., WASHINGTON, D. C.

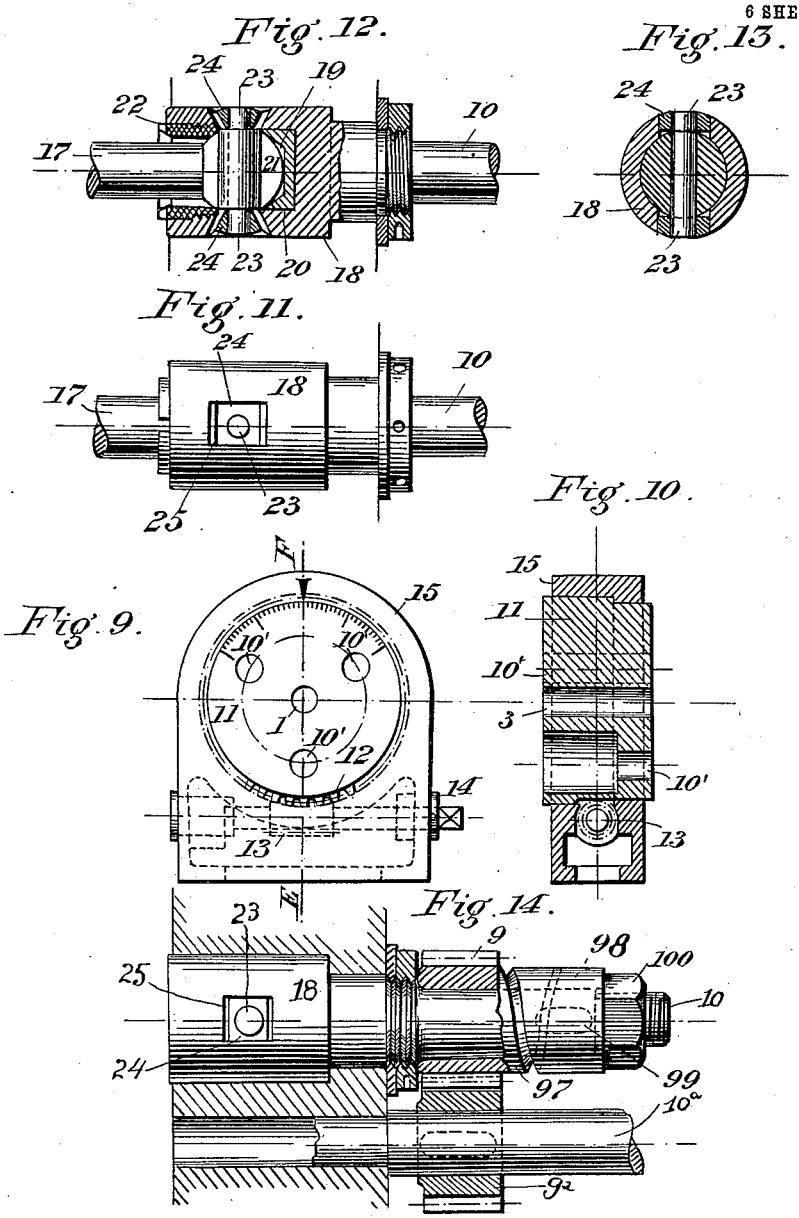

UNITED STATES PATENT OFFICE.

HENRI DESPAIGNE, OF BRUSSELS, BELGIUM.

SCREW-BOLT-ROLLING MACHINE.

999,634.   Specification of Letters Patent.   Patented Aug. 1, 1911.

Application filed November 6, 1907. Serial No. 400,943.

*To all whom it may concern:*

Be it known that I, HENRI DESPAIGNE, a citizen of the French Republic, residing at No. 148 Rue Berckmans, Brussels, in the Kingdom of Belgium, have invented new and useful Improvements in Screw-Bolt-Rolling Machines, of which the following is a specification.

The machines at present used for producing screw threads in hot pieces are adapted primarily for the manufacture of wood screws. These screws need not have threads of mathematical exactness, and it happens very often that the threads vary in pitch at different points of the screw. Furthermore it is not absolutely necessary that the body of these screws be of a constant diameter nor even that it be exactly circular. It is quite a different matter when machine screws are to be manufactured, or any other screw-threaded male member to be used with a female screw-threaded member, then the screw thread must register exactly with the corresponding screw thread of the nut.

One embodiment of the machine is shown by way of example on the annexed drawing, in which, Figure 1 is a side view of the machine; Fig. 1ª is a longitudinal sectional view thereof; Fig. 2 is a top plan view of the machine; Fig. 2ª is a top view of the screw bolt holder; Figs. 3 and 4 are opposite end elevations of the machine. Fig. 3ª is a detail view of the screw ejector; Fig. 4ª represents the device which returns the rollers to their initial position after the finished screw bolt has been ejected; Fig. 5 is a section on line A—B of Fig. 4ª; Fig. 6 is a front view of the front head of the machine and shows how the three rollers are fitted; Fig. 6ª is a detailed view of one of the sliding members shown in Fig. 6; Fig. 7 is a section on line C—D of Fig. 6; Fig. 8 is a section of the rack bar and of the locking bolt for the adjustment of the rollers; Fig. 9 is a top view on the rear head of the machine, showing how the roller shafts are mounted on this rear part; Fig. 10 is a section on line E—F of Fig. 9; Figs. 11, 12 and 13 show a top view and longitudinal and transverse sections of the joints which communicate the movement of the main shaft to the roller shafts, and Fig. 14 represents a detail of the mechanism which communicates the rotating movement to the roller shafts and of the device allowing the micrometric circular adjustment of the rollers.

The main shaft 1 of the machine is driven through a pulley 2 of large diameter and with a heavy broad rim which enables it to act as a flywheel. On this pulley or flywheel runs a belt (not shown) which can be driven in any suitable way. The pulley 2 runs loose on the shaft 1 and its rotation may be communicated to the shaft by means of any suitable friction-gear. This gear is thrown in and out by means of a two-armed lever 3, connected to a rod 4, which is operated by a hand lever 5. The hand lever 5 is fixed in the notches of the sector 7 by means of a yielding latch 6. This device allows for the wear of the gearings and of constantly assuring a perfect power transmission.

On one end of the shaft 1 is keyed a toothed wheel 8 which gears with the toothed wheels 9 and 9ª fixed on small shafts 10 and 10ª, which are placed horizontally at 120° from each other and concentrically to the shaft 1. The arrangement of these wheels on their shafts is represented in detail in Fig. 14. The gearing wheels 9 are loose on the shafts 10 and each is provided with a long hub 97. The front face of this hub is screw-shaped. On the projecting portions of the shafts 10 are mounted sleeves 98, the faces of which are opposed to the screw-shaped faces of the wheel hubs 97. The sleeves 98 are notched inside. Into these notches fit feathers 99 fixed on the shafts 10. These sleeves 98 can, consequently, slide on the shafts, but when rotated cause the shafts to rotate. The sleeves 98 are adjusted by means of the nuts 100, and a very fine thread cut on the end of the shafts 10. The sleeves 98 constitute longitudinally adjusting devices for the shafts 10 and 17. The rotation of the pinion 8 causes the pinions 9 to rotate.

The shafts 10 and 10ª are journaled in bearings 10′ which are in plate 11 (Figs. 9 and 10). The plate 11 is provided on its circumference with a screw thread 12. This screw thread registers with a worm 13, the axle of which projects with its square end 14 from the cast-iron casing 15 which forms the rear supporting head of the shafts 17 and in which the plate is disposed. This casing 15 is fixed on the frame 16 of the machine. When turning the worm 13 (for instance by hand, by means of a handle fixed on the square end 14), the plate 11 is moved. This allows of adjusting the three shafts mounted in plate 11 relatively to the shaft 1 and to change the inclination of the roller shafts according to the screw threads to be produced. It will be readily noticed, that the movements of the plate 11 do not interfere with the transmission of the rotation from the shaft 1 to the shafts 10 and 10$^a$ and that it does not alter the angle at which the three shafts are mounted relatively to each other. A scale on the outside of the plate 11 allows of exact adjustment.

The roller shafts 17 are driven from the shafts 10 and 10$^a$ by means of peculiar construction represented in detail in Figs. 11, 12 and 13. The horizontal shafts 10 and 10$^a$ each has on one of its ends an enlarged cylindrically bored head 18, the outer cylindrical part of which turns in the bearing 10' of the plate 11. Inside of this cylindrically bored head 18 and at its bottom is provided a suitably shaped piece 20 adapted to form a seat for the ball-shaped end 21 of the shaft 17. This ball-shaped end is pressed against the seat 20 by means of a threaded ring 22, which is screwed in the front part of the shaft head and rests against the ball-shaped head 21. In this way, the longitudinal pressure exerted on the shafts 17 during the rolling process, is absorbed by the shafts 10 and 10$^a$ and plate 11. The ball-shaped heads 21 are traversed by pivot members, the ends 23 of which rotate in the disk-like bearings 24, carried by the shaft heads 18. As represented in Figs. 11, 12 and 13, the bearings 24 are mounted in the slots 25 in such a way that the movement of the shafts 10 and 10$^a$ and of the shaft heads 18 causes the bearing to rotate, whatever the relative inclination of the axles 17 and the shafts 10 and 10$^a$. It will be noticed that, owing to this special construction, any inclination can be given to the shafts 17, by turning the plate 11 to the right or to the left, even while the machine is running and without interfering with the transmission of the movement. In thus changing the angle of the shafts 17, the rollers 29 are also adjusted relatively to each other.

The three shafts 17 project across the front head 28 of the machine and bear each at its end a roller 29 which is provided with grooves corresponding with the screw thread which is to be produced.

The solid or hollow piece which is to be provided with a screw thread, is placed in a holder 30, which is provided with an opening 31 (Fig. 2$^a$) into which the head of the bolt or screw bolt is introduced, so that its axis registers with the axis of the rolling apparatus. Holder 30 projects from a rod 32, which slides in a sleeve 33, supported by a standard 34, rigidly fixed to the frame of the machine. On the part of this rod which projects from the standard 34, a ring or nut 35 can slide, which, when the rod is pushed forward, will strike, at a given moment, the end of the lever 36. This device allows of adjusting the length of the screw-threaded part, as will be explained hereinafter. The forehead has the form of an open box or casing (Figs. 1, 6 and 7) rigidly mounted on the frame 16 of the machine. The vertical wall of this box or casing bears three sheaths 37, 38, 39. In each of these sheaths is mounted a sliding member (40, 41, 42). Each of these sliding members bears, at its end, a universal bearing 44 and 44', each of which bears one of the shafts 17. In this way, the rotation of the shafts 17 is assured and consequently the rotation of the rollers, whatever be the inclination of the shafts and however near the rollers be placed to each other.

The sliding member 40 is mounted in its sheath 37 in such a way as to move longitudinally under the action of screw-threaded nuts 43. These nuts are turned by hand and allow of adjusting the distance of the shaft mounted in the bearing 44 to the rolling axis. But this adjustment is made once for each determined diameter which is to be rolled and, when normally running, the member 40 remains longitudinally stationary in its sheath.

As to the members 41 and 42, they bear their bearings of one piece through the intermedium of a screw-threaded rod, having a lock nut 45, allowing of the independent adjustment of the position of the bearings in the members. These screw-threaded rods rest with their outer ends 46 on two wedge-shaped supports 47. These wedge-shaped supports 47 are adapted to slide along two vertical guides 48, fixed to the box or casing 28. According to whether these wedge-shaped pieces 47 go up or down, along their guides 48, they tend to push the shafts 17 nearer to the rolling axis or to permit them to recede from it. The two wedge-shaped pieces 47 always move together owing to the fact that each of them is provided on its vertical face with a rack 49, each of which meshes with a corresponding pinion 50, both of which are fixed on a common axis 51 which traverses the forehead 28. This kind of support for the roller shafts assures an absolute rigidity. In fact, after the beginning of the rolling process and during this process, the members which support the shafts are completely blocked and protected against all spreading efforts on the part of the working piece. This construction forms a very important feature in the production of regular screw threads.

The axle 51 bears in the middle a toothed wheel 52 which engages with a toothed rack 53, represented in Fig. 8. The toothed rack slides in a horizontal guide rigidly fixed on the frame and bears at its end a head 54, the position of which can be adjusted. On the head is a tooth 55 and this head is connected to a rectangular and internally threaded member 56 which slides in a casing 57 of the toothed rack. Member 56 is threaded and receives the screw-threaded end 58 of a rod 59. The other end of the rod 59 is made square so as to adapt it to receive a key. By turning rod 59, the position of the head 54 is adjusted. The toothed rack can consequently be moved forward and backward, the head 54 abutting against the locking bolt 60. By moving the toothed rack wheel 52 on the shaft 51 is turned and the wheels 50 are caused to rotate thus producing the adjustment of the sliding members 41 and 42 in such manner as to cause the rollers to be moved inwardly or outwardly according to the diameter of the piece to be worked. This device allows pieces of different diameters to be worked and also for the adjustment of the tools necessitated by the wear of the same. The head 54 remains stationary during the rolling operation against a locking bolt 60. Withdrawing of the locking bolt at the moment when the screw thread is finished permits the screw to be ejected by means of the mechanism to be referred to hereafter. The bolt 60 receives only a small part of the roller pressure, owing to the rolling shafts being mounted on radially movable supports resting against wedge-shaped pieces 47 which absorb most of the said pressure.

The operation is as follows: When the machine has been started and the rollers caused to rotate, the operator places the heated bolt in the clutch 30 and exerts a pressure on the shaft 32 to force the end of the bolt between the rollers. As soon as the work-piece has been caught by the rollers, their rotation causes it to advance and the screw thread is rolled into the same. During this entire process the head 55 of the toothed rack rests in contact with the locking bolt 60. The toothed rack 53 being also fixed, the wheel 52, the axle 51, the wheels 50, the toothed racks 49 and the shafts 17 maintain their relative positions with the rollers. As the rolling proceeds, the shaft 32 advances and at a given moment, which is predetermined by the length which the threaded part of the bolt is to have, the nut 35 abuts against the end of the lever 36 (Figs. 1, 1ª and 3ª). The movement of the lever causes the rod 63 (Fig. 3ª) to move. Rod 63 operates the lever 64 mounted on the shaft 65. Lever 64 has a finger 66 which rests against a projection 67 on the locking bolt 60. At the moment when the rod 63 is moved to the left, the lever 65 is operated and the finger presses the lock-bolt downward, by compressing the spring 68 and thus releases the toothed rack 53 and consequently the toothed wheel 52 and the axle 51. On the projection of this axle 51, is placed a lever 69 which is connected with one of the ends of the lever 70, through a rod 71, which consists of two pieces and can be lengthened or shortened by means of a sleeve 72. The ends of the two parts of the rod bear opposite threads, which screw into the sleeve 72. The lever 70 is fixed on an axle 73 and is provided with a projection 74, on which the counterweight 75 is mounted. The counterweight can be replaced by a spring.

Fig. 3ª shows how when the head 54 is released by the disengagement of the lock-bolt 60, the counterweight presses the lever 69 upward so that the axle 51 is turned in the direction of the arrow (Fig. 7). Toothed wheels 50 act on the toothed racks so as to cause the wedge-shaped pieces 47 to lower. At this stage, the sliding members 41 and 42 and the rollers are removed from the upper corresponding roller, and the ejection of the finished screw bolt takes place. This effect is obtained owing to the fact that the rod 74 which bears the counterweight is connected to a rod 77, at the end of which is placed a slide 78 which receives a pin 79 that is fixed to a lever 80 on the shaft 65 on which is also fixed the lever 64. The oscillation of the lever 64 which releases the lock bolt, presses the bolt 79 upward near the end of the slide, so that when the counterweight 75 draws back, owing to the withdrawal of the bolt lock 60, the rod 77 will be drawn downward immediately after the roller shafts have been spread and thus pull the lever 80 downward, which movement will turn the axle 65 and cause the lever 64 to draw the clutch 30 back through the agency of the levers 63 and 36.

The ejection of the finished piece can also be produced by hand. For this purpose, the projecting portion of the shaft 62, upon which is mounted the lever 36, bears a hand lever 76 by pressure on which the oscillation of the axle 62 and the release of the lock bolt, is produced. Finally, the machine is provided with a device which returns the rollers into their normal position as soon as the rolled pieces are ejected, thus permitting another bolt to be rolled. This device is represented in Figs. 4ª and 5. As explained above, the movement of the counterweight 75 corresponds with the ejection of the finished piece, the lever 80 being drawn downward, so that the axle 65 of this lever is rotated. This axle 65 bears a finger 81 on which rests a locking bolt 82, which is pressed downward by a spring 83, the stress of which is adjustable by means of a screw 84. The axle 65 is rotated by the lever 94 through the medium of link connections 70 and 71 indicated by dot and dash lines in Figs. 1ª and 4ª, and in full in Fig. 3ª. The rotation of the axle 65 through the drop of the counterweight produces the lifting of the bolt 82 through the finger 81 and its disengagement with a clutch 85 which is slidably mounted on the horizontal shaft 86. The shaft 86 is driven by the main shaft 1 through the set of wheels 87. On the shaft 86 is fixed a collar 88, against which presses a spring 89, the other end of which presses against the clutch member 85, so that at the moment when the clutch member is released by the bolt 82, it is pressed by the spring against the clutch member 90, so that this element also participates in the rotation of the shaft 86. The teeth of the clutch parts 85 and 90 are inclined so as to be brought into engagement with each other and in case some impediment placed accidentally between the rollers should prevent them from approaching sufficiently near each other, the spring 89 gives way and the two parts move away from each other to prevent breakage. The member 90 bears on its periphery a toothed crown 91, which engages with a toothed rack 92 (Figs. 4ª and 5). This rack has a yielding connection 93 with the end of a lever 94, keyed on the axle 73, bearing the lever of the counterweight so that the rotation of the sleeve 90 causes the rack-bar and the rod of lever 94 to be raised. The raising of this lever 94 causes the rotation of the axle 73, which has for its effect to return the counterweight to its original position, so as to produce the desired disengagements for the next operation. As to bolt 82, it is necessary, in order to enable it to engage with its sleeve 85, that the sleeve be pushed back at the moment when the locking bolt goes down. This result is obtained by means of a wedge-shaped piece 95 carried by the rod of the rack 92, the inclination of said wedge corresponding with the inclination of the generating lines of a cone 96 forming part of the sleeve 85. Piece 95 remains constantly in contact with the cone, so that the sleeve 85 is pushed back when the rod 92 rises.

I claim:—

1. In a screw threading machine having a plurality of coöperating roller shafts carrying thread-forming dies, means for mounting said shafts comprising front and rear heads, a plate rotatably mounted in said rear head, stub shafts journaled in said plate, ball and socket couplings connecting said stub shafts with said roller shafts, means for driving said shafts in unison, and means mounted in said rear head for turning said plate, whereby to effect relative adjustment between the die shafts during the rotation of said die shafts.

2. In a screw threading machine having a plurality of coöperating roller shafts carrying thread-forming dies, means for mounting said shafts comprising front and rear heads, a plate rotatably mounted in said rear head, stub shafts journaled in said plate and having flexible couplings with said roller shafts, means for driving said shafts in unison, means for turning the rotatable plate to effect relative adjustment between the shafts during the rotation of the shafts, and automatically actuated means for separating the shafts at their die-carrying ends on the completion of the screw threading operation.

3. In a screw threading machine having a work holding piece and a plurality of roller shafts carrying thread forming dies arranged in coöperative relation, front and rear heads in which said shafts are mounted, mechanism for automatically throwing the shafts into and out of operation, a setting device for said shafts comprising slidable wedge-shaped supports, a shaft having a plurality of pinions, some of said pinions in engagement with and adapted to actuate the supports, a toothed rack adapted to mesh with another of said pinions, a lever on said pinion shaft, a counter-weight connected with and controlling said lever, a locking device associated with the counter-weight and adapted to hold the latter in inoperative position, and means connected with the work holder and operable therethrough to effect the release of said counter-weight from its locked position and cause said weight to rotate said pinion shaft as set forth.

4. In a screw threading machine having a work holder and a plurality of roller shafts carrying thread forming dies arranged in coöperative relation, front and rear heads in which said shafts are adjustably mounted, mechanism for automatically throwing the shafts into and out of operation, a setting device for said shafts comprising slidable wedge-shaped pieces disposed in coöperative relation, a shaft having pinions adapted to mesh with said slidable pieces, a counter-weight connected with said pinion shaft and adapted to throw the die shafts into and out of operative position through the medium of said slidable pieces, a locking device for keeping said die shafts in working position, and means for automatically releasing said locking device and withdrawing the piece worked, comprising a rod connected at one end to the locking device for the die shafts and at its other end with the work holder, said former connection having a lost motion when operating in one direction whereby to prevent the counter-weight from withdrawing the work holder before the die shafts have been brought into inoperative position.

5. In a screw threading machine having a work holder and a plurality of roller shafts carrying thread-forming dies arranged in coöperative relation, front and rear heads in which said shafts are adjustably mounted, mechanism for automatically throwing the shafts into and out of operation, a setting device for said die shafts comprising slidable wedge-shaped pieces, a shaft having pinions adapted to mesh with and actuate said pieces, a toothed rack meshing with one of said pinions, a counter-weight connected with said pinion shaft and adapted to actuate the same, a locking device associated with the rack for holding said counter-weight in inoperative position, means for automatically releasing said counter-weight through the medium of the work holder, and a means for restoring the counter-weight and its associated parts into their working position, said means comprising a rotatable shaft having a clutch mounted thereon, a rack bar meshing with said clutch, a connection between said rack bar and said counter-weight, and a device for automatically disengaging the clutch elements.

6. In a screw threading machine having a plurality of roller shafts carrying thread-forming dies arranged in coöperative relation, front and rear heads in which said shafts are mounted, a plate rotatably mounted in one of said heads for carrying the shafts mounted in said head, means for rotating said plate, stub shafts mounted in one of the heads and disposed in parallel relation, driving pinions mounted on said shafts, one of which pinions is mounted so as to permit movement relative to its shaft, ball and socket couplings connecting the shafts carrying the thread-forming rollers with the stub shafts, means for imparting movement to said stub shafts comprising a gear, driving means adapted to mesh with the pinions on the stub shafts, the pinion which is movable relatively to the shaft being provided with a hub having a screw-shaped face, and means associated with said screw elements whereby the working faces of the threaded rollers are shifted relatively to each other, the pinions being maintained in the same position relatively to the head which carries the stub shafts.

In witness whereof I have hereunto set my hand in presence of the witnesses.

HENRI DESPAIGNE.

Witnesses:
G. MEYER,
GREGORY PHELAN.

---

Copies of this patent may be obtained for five cents each, by addressing the "Commissioner of Patents. Washington, D. C."